United States Patent Office 3,036,071
Patented May 22, 1962

3,036,071
PROCESS FOR THE MANUFACTURE OF DIOXAZINE DYESTUFFS
Christoph Frey, Basel, Rudolf Mory, Dornach, and Eduard Moser, Bottmingen, Switzerland, assignors to Ciba Limited, Basel, Switzerland, a Swiss company
No Drawing. Filed Aug. 8, 1960, Ser. No. 47,948
Claims priority, application Switzerland Aug. 19, 1959
4 Claims. (Cl. 260—246)

This invention provides a new process for the manufacture of dioxazine pigments which are free from groups imparting solubility in water and are made by subjecting quinones to ring closure. In the process of this invention thionyl chloride is used as ring-closing agent.

Many processes are known for subjecting 2:5-diarylaminoquinones to ring closure to form the corresponding dioxazines. Thus, it is known to carry out the ring closure in an organic high-boiling inert solvent in the presence of an acid chloride, for example, benzoyl chloride, paratoluenesulfonyl chloride, meta-nitrobenzene sulfonyl chloride, benzene sulfonyl chloride or benzotrichloride, or in the presence of a metal chloride, for example, aluminum chloride, ferric chloride, cuprous chloride or zinc chloride.

The known processes of the above kind are generally carried out at a high temperature, more especially within the range of 170° C. to 250° C. It is also known to carry out the aforesaid ring closure at a lower temperature in an inorganic medium, for example, by the action of concentrated sulfuric acid or oleum on condensation products of chloranil with, for example, para-aminosalicylic acid or like compounds. Depending on the conditions used there are often obtained more or less strongly sulfonated dioxazines. When the products obtained are free from sulfonic acid groups, they are often in the form of crystal modifications which are not suitable for use as pigments.

The present invention is based on the observation that dioxazines are formed by subjecting a quinone of the general formula (1)

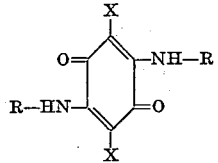

in which X represents a halogen atom or a substituent, and the two R's represent different or advantageously identical aromatic radicals, which contain in a position vicinal to the —NH— bridge an aryloxy or advantageously an alkoxy group, with the use of thionyl chloride as condensing agent.

As starting materials there are advantageously used compounds of the general Formula 1, in which the two X's represent halogen atoms, especially chlorine atoms, and the two R's represent different or advantageously identical aromatic radicals.

As starting materials there are advantageously used quinones of the formula (2)

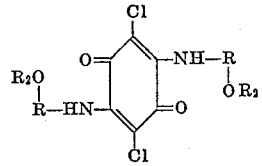

in which the two R's advantageously represent identical aromatic radicals, and the symbols $R_2$ represent aryl or alkyl groups and each radical —$OR_2$ is bound to the benzene radical in a position vicinal to the —NH— group.

The compounds of the Formulae 1 and 2 used as starting materials can be obtained by methods in themselves known by condensing one molecular proportion of a parabenzoquinone of the formula (3)

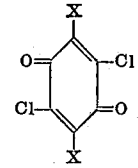

in which the symbols X have the meaning given above, with 2 molecular proportions of an arylamine, advantageously an aminobenzene.

As starting materials there are advantageously used compounds of the Formula 1, in which the two X's are halogen atoms, advantageously chlorine atoms. In the compounds of the Formulae 1 and 2 the aromatic radicals R are advantageously benzene radicals which contain in orthoposition to the imino group and aryloxy or advantageously an alkoxy group. Furthermore the benzene radical may contain further substituents, for example, halogen atoms especially chlorine, alkyl groups, for example, methyl groups, aryl radicals, for example phenyl groups, alkoxy groups, for example methoxy, ethoxy or isopropoxy groups, nitro groups, urea-aryl or urea-alkyl groups, for example, phenyl-urea groups, acylamino groups, for example, formylamino, acetylamino, napththoylamino or especially benzoylamino groups, in which latter groups the benzoyl radical may be substituted, for example, by halogen atoms or alkyl, alkoxy, nitro, cyano, acylamino or arylamino, and especially phenyl, groups. As examples of suitable acylamino radicals there may be mentioned acylamino groups which contain the radicals of the following carboxylic acids:

Benzoic acid,
4-methyl-benzenecarboxylic acid,
2-fluorobenzene carboylic acid,
2-chloro-benzene carboxylic acid,
2:4-dichloro-benzene carboxylic acid,
2:5-dichloro-benzene carboxylic acid,
4-bromo-benzene carboxylic acid,
4-phenyl-benzene carboxylic acid,
4-phenyl-azo-benzene carboxylic acid,
4-methoxy-benzene carboxylic acid,
3-methoxy-benzene carboxylic acid,
4-cyano-benzene carboxylic acid,
4-nitro-benzene carboxylic acid and
1- or 2-naphthalene carboxylic acid.

In the process of this invention ring closure to form the oxazine ring from the above-mentioned starting materials is carried out by using thionyl chloride as condensing agent. The reaction is advantageously carried out in a high boiling inert organic solvent, for example, mono-, di- or tri-chlorobenzene, naphthalene, nitrobenzene or chloro-naphthalene or cymene at a raised temperature. Advantageously the reaction is carried out at a temperature within the range of 120° C. to 300° C., especially between 130–180°.

In this process there are used for each mol of starting materials at least 0.5 mol and not more than 4 mols of thionyl chloride. The reaction is advantageously carried out with 1.5 to 2.5 mols of thionyl chloride per mol of starting material. The reaction may be carried out by adding thionyl chloride dropwise to one of the above mentioned starting materials in an inert organic solvent at a raised temperature.

As compared with dioxazines made by the known processes, the dioxazines made by the process of this invention are distinguished by their soft texture. Furthermore the latter process gives a better yield of pigment at a lower temperature and only gaseous decomposition products.

The dioxazines obtained by the process of this invention and which have the general formula

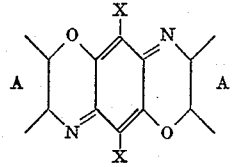

in which the two X's have the meanings given above and the two A's represent identical or different aryl radicals, are valuable pigments which can be used for all the customary applications of pigments.

The following examples illustrate the invention, the parts and percentages being by weight:

*Example 1*

125 parts of 2:5-dichloro-3:6-bis-(2':5'diethoxy-4'-benzoylamino-phenylamino)-1:4-benzoquinone, obtained by condensing two mols of 4-benzoylamino-2:5-diethoxy-1-aminobenzene with 1 mol of chloranil in the presence of crystalline sodium acetate, are heated in 780 parts of ortho-dichlorobenzene at 90–100° C. At that temperature there are added dropwise in the course of ½ hour 46 parts of thionyl chloride. The whole is then heated to 145–150° C. and stirred at that temperature for a further 4 hours. The whole is allowed to cool to 100° C., and is then neutralized with 5 to 10 parts of an aqueous solution of ammonia of about 24% strength and then filtered. The filter radical is well washed with warm ortho-dichlorobenzene, with methanol and with hot water and dried at 100–120° C. There are obtained 100 parts of 2:6-dibenzoylamino - 3:7 - diethoxy - 9:10 - dichloro - triphendioxazine in the form of a violet crystalline powder. The latter, after being conditioned by a known method, for example, by grinding it with a salt in the presence of a water-soluble or water-insoluble organic solvent or by kneading or grinding the crude pigment in the presence of a solid assistant, for example, a salt capable of being removed by washing, when rolled into polyvinyl chloride yields violet foils of very good fastness to migration and light.

Further dioxazine dyestuffs are obtained by using in the procedure described above, instead of 2:5-dichloro-3:6-bis - (2':5' - diethoxy - 4' - benzoylamino - phenylamino)-1:4-benzoquinone, equivalent quantities of the compounds listed in the following table:

*Examples 2 to 30*

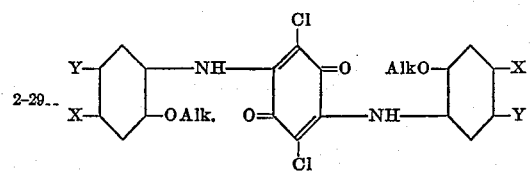

| | X | Y | Alk. | Tint |
|---|---|---|---|---|
| 2 | —H | —NO$_2$ | CH$_3$ | Yellowish brown. |
| 3 | —H | —Cl | CH$_3$ | Bordeaux. |
| 4 | —OCH$_3$ | —Cl | CH$_3$ | Violet. |
| 5 | —H | —SO$_2$—CH$_2$—⌬ | CH$_3$ | Orange. |
| 6 | —NH—CO—⌬—CH$_3$ | —H | CH$_3$ | Red-violet. |
| 7 | —NH—CO—⌬(Cl,Cl) | —H | CH$_3$ | Red. |
| 8 | —NH—CO—⌬—F | —H | CH$_3$ | Bluish-red. |
| 9 | —NH—CO—(naphthyl) | —H | CH$_3$ | Red. |
| 10 | —N(CO—)(CO—) (naphthyl) | —H | CH$_3$ | Brown. |
| 11 | —H | —NH—CO—⌬—⌬ | CH$_3$ | Red. |
| 12 | —NH—CO—⌬—⌬ | —H | CH$_3$ | Bordeaux. |
| 13 | —NH—CHO | —OC$_2$H$_5$ | —C$_2$H$_5$ | Violet. |
| 14 | —NH—CO—⌬—Cl | —OCH$_3$ | —CH$_3$ | Blue. |

Examples 2 to 30—Continued

| | X | Y | Alk. | Tint |
|---|---|---|---|---|
| 15 | —NH—SO₂—⬡ | —OC₂H₅ | —C₂H₅ | Violet. |
| 16 | —N(CO—CH₂)(CO—CH₂) | —OC₂H₅ | —C₂H₅ | Bordeaux. |
| 17 | —N(CO)(CO)—⬡ | —OC₂H₅ | —C₂H₅ | Do. |
| 18 | —NH—CO—⬡—COOCH₃ | —OC₂H₅ | —C₂H₅ | Violet. |
| 19 | —NH—CO—⬡(SO₂N(C₂H₅)₂)(Cl) | —OC₂H₅ | —C₂H₅ | Blue. |
| 20 | —NH—CO—⬡(SO₂—CH₂—⬡)(Cl) | —OC₂H₅ | —C₂H₅ | Red-Violet. |
| 21 | —H | —H | —CH₃ | Red. |
| 22 | —NH—CO—⬡(SO₂—C₂H₅)(Cl) | —OCH₃ | —CH₃ | Red-violet. |
| 23 | —NH—CO—(quinoline-⬡) | —OCH₃ | —CH₃ | Bordeaux. |
| 24 | ⬡(OCH₃)—N(CO)(CO)—⬡ | —H | —CH₃ | Red-Violet. |
| 25 | —NH—CO—⬡ | —O—CH(CH₃)(CH₃) | —CH(CH₃)(CH₃) | Violet. |
| 26 | —NH—CO—⬡ | —OCH₃ | —CH₃ | Violet-blue. |
| 27 | —NH—CO—⬡ | —H | —CH₃ | Bordeaux. |
| 28 | —H | —NH—CO—⬡—Cl | —CH₃ | Do. |
| 29 | —NH—CO—⬡—⬡ | —OC₂H₅ | —C₂H₅ | Violet. |
| 30 | dibenzofuran-OCH₃—NH—(Cl,Cl-benzoquinone)—NH—dibenzofuran-OCH₃ | | | Do. |

What is claimed is:

1. A process for the manufacture of dioxazine pigments which comprises heating in an inert organic solvent with thionyl chloride a quinone of the formula

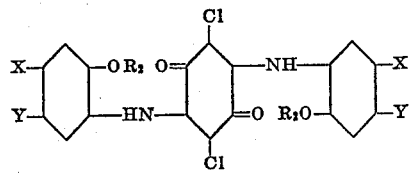

in which $R_2$ represents alkyl having at most 4 carbon atoms X and Y represent members selected from the group consisting of hydrogen and halogen atoms, lower alkoxy and acylamino having up to 16 carbon atoms.

2. A process for the manufacture of dioxazine pigments which comprises heating in an inert organic solvent with thionyl chloride a quinone of the formula

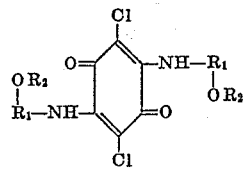

in which $R_1$ is phenylene and $R_2$ alkyl having at most 4 carbon atoms wherein $OR_2$ is bound in ortho-position to the NH-bridge.

3. A process as claimed in claim 2, wherein there are used 0.5 to 4 mols of thionyl chloride per mol of the quinone.

4. A process as claimed in claim 2, wherein the formula of the quinone is

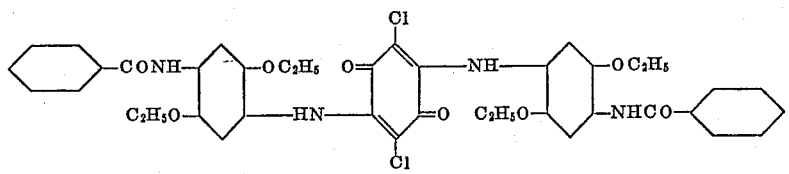

References Cited in the file of this patent

UNITED STATES PATENTS

| | | |
|---|---|---|
| 2,026,093 | Kranzlein et al. | Dec. 31, 1935 |
| 2,355,496 | Zwilgmeyer | Aug. 8, 1944 |

OTHER REFERENCES

Kimura et al.: Chemical Abstracts, vol. 47, page 6359 (1953).